United States Patent [19]

Newell

[11] E Re. 30,591

[45] Reissued Apr. 28, 1981

[54] ROPE PULLING DEVICE

[76] Inventor: Strohm Newell, 2350 Sixth Ave., Apt. 9B, San Diego, Calif. 92101

[21] Appl. No.: 944,053

[22] Filed: Sep. 19, 1978

Related U.S. Patent Documents

Reissue of:

[64] Patent No.: 3,343,809
Issued: Sep. 26, 1967
Appl. No.: 629,351
Filed: Mar. 27, 1967

U.S. Applications:

[63] Continuation-in-part of Ser. No. 528,519, Feb. 18, 1966, abandoned.

[51] Int. Cl.[3] ..... B65H 59/00

[52] U.S. Cl. ..... 254/134.3 FT; 24/130; 254/333; 254/372

[58] Field of Search ..... 254/134.3–134.6, 254/175.5, 175.7, 150, 168, 188, 190 A; 226/182, 183, 188, 192, 229; 74/230.5, 230.9, 230.24; 242/155; 24/130

[56] References Cited

U.S. PATENT DOCUMENTS

| | | | |
|---|---|---|---|
| 26,707 | 1/1860 | Planer | 74/230.5 |
| 1,847,177 | 3/1932 | Freedlander | 74/229 |
| 2,802,366 | 8/1957 | Borner . | |
| 3,043,926 | 7/1962 | Rabeux et al. | 242/155 |
| 3,078,074 | 2/1963 | Benedict | 254/175.5 |
| 3,302,932 | 2/1967 | Wallin . | |

FOREIGN PATENT DOCUMENTS

| | | |
|---|---|---|
| 648147 | 7/1937 | Fed. Rep. of Germany . |
| 27210 | 12/1902 | Switzerland . |

OTHER PUBLICATIONS

Hiscox, Gardner D., Mechanical Movements Powers and Drives, N. Y., N. W. Henley, 1921, p. 30.

*Primary Examiner*—Robert C. Watson
*Attorney, Agent, or Firm*—Neil F. Markva

[57] ABSTRACT

My invention is a device for pulling and securing rope. It includes a power driven disk with annular groove having a V-shaped cross section. Bearing surfaces are transversally spaced around the periphery of the inner faces of the grooves. Gripping, without slippage occurs when a taut rope wedges into the groove and against the bearing surfaces.

22 Claims, 10 Drawing Figures

FIG. 6
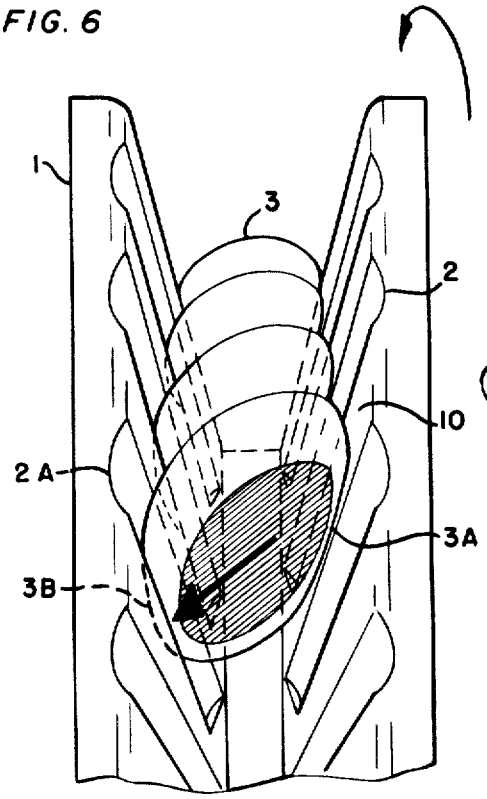
FIG. 7
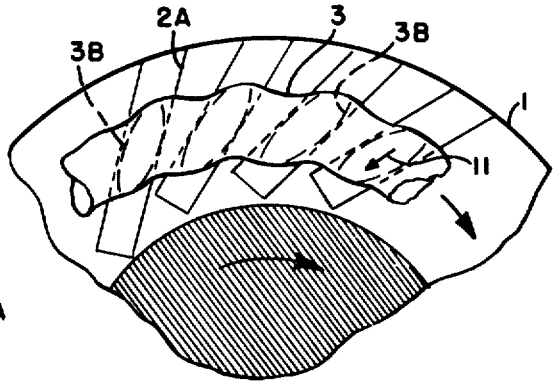
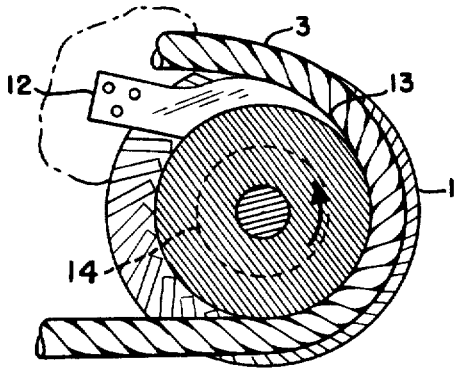
FIG. 8
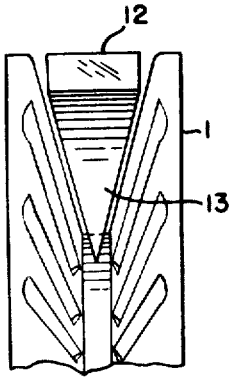
FIG. 9
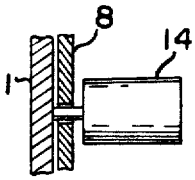
FIG. 10

ROPE PULLING DEVICE

Matter enclosed in heavy brackets [ ] appears in the original patent but forms no part of this reissue specification; matter printed in italics indicates the additions made by reissue.

The present application is a continuation-in-part application of my U.S. Pat. application having Ser. No. 528,519, filed Feb. 18, 1966, and which is now abandoned.

BACKGROUND OF THE INVENTION

My improved device is structured for use in lineal movement or securing of a load attached to a rope. The present method of pulling such rope is with a winch. The well-known disadvantages of a winch may now be avoided. For example, the application of manual labor to keep tension on a rope is not needed. Slippage of the rope is obviated with my assembly. Pulling a rope of any length for any distance may now be accomplished without winding the same on a drum or the like. Use in power-take-offs on trucks; pulling wire through conduits and hoisting loads of great weights for various distances are examples of the use of my device. When it is used to secure rope under tension, disk rotation of only 120 degrees is sufficient for all requirements.

DESCRIPTION OF THE PRIOR ART

All prior art depends on friction reducing means. For example Benedict U.S. Pat. No. 3,078,074, has ridges and grooves which radiate from the center area of a "pulley." This may be effective for the stated use as a boat anchor windlass.

Other V-type pulleys are used to continuously run mechanisms in place and instead of belts or chains. These do not have transverse ridges and grooves. The ridges and grooves are not positioned to take advantage of the twists of ropes. Such pulleys would permit the rope to slip if subjected to the lineal pulls demanded of my device.

SUMMARY OF THE INVENTION

A disk-shaped member is provided with a groove completely around the periphery thereof. Tapered inner walls of the groove have semi-cylindrical recesses channeled out of the surfaces thereof. These recesses are spaced equi-distance from each other. They are positioned transversely in respect to a shaft through the center of the member. A power source is secured to said shaft for rotating the disk-shaped member. A rope engages with the recesses in the groove and follows an arcuate path around the major portion of the disk-shaped member. An idler wheel helps guide the rope into the groove and a finger helps disengage the rope from the recesses. A load attached to the end of the rope is pulled in the direction of rotation of the member as it is driven by the power source.

BRIEF DESCRIPTION OF THE DRAWING

FIG. 6 is a diagram showing the rope meshing into a double structured groove.

FIG. 7 is a diagrammatic view from the cutaway side of the periphery of the disk showing the position of the rope when in use.

FIG. 8 is a cutaway side view of the disk showing the finger acting upon the rope.

FIG. 9 is a detail from the edge of a portion of the disk showing the position of the finger in respect thereto.

FIG. 10 is a detail showing the power source.

DESCRIPTION OF THE PREFERRED EMBODIMENTS

Figure 1:
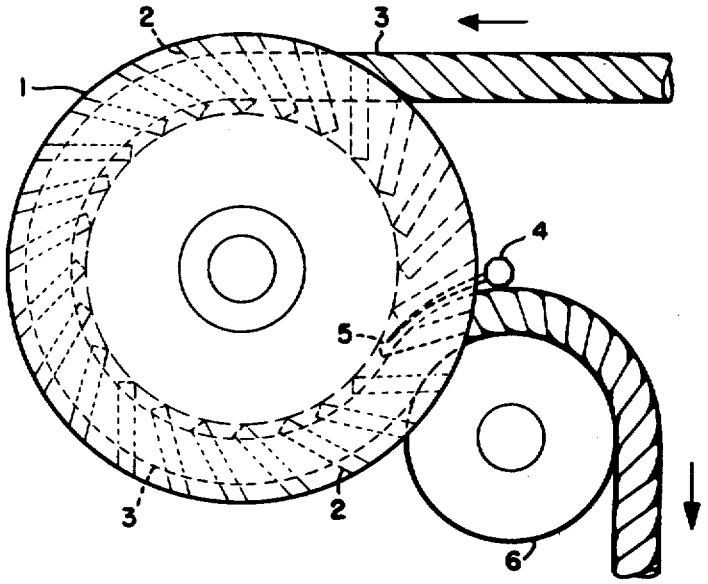
FIG. 1 is a diagram showing the path of the rope in my device.
Figure 2:
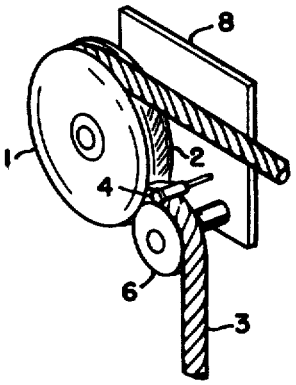
FIG. 2 is a perspective view of a form of my device.

In FIG. 1 the numeral 1 represents a disk-member with an annular groove having a V-shaped cross section. It is preferably made of a light metal such as aluminum. Its center is secured to a shaft (not illustrated) disposed at a 90 degree angle to the surface thereof for rotation in unison therewith. The shaft is journaled in a suitable support 8. The support may be of various sizes and shapes and may retain other members of my novel assembly as is shown in FIG. 2.

A conventional power source, item 14 of FIG. 10, rotates the shaft and disk. Such power source may be an electric motor with worm gear. An optimum speed of approximately 15 r.p.m. may then be maintained.

[One or both of the inner faces of the groove are transversally channeled out, semi-cylindrically, to form a series of ribs 2 completely around the inner periphery of the groove. The ribs have a wave-like appearance with grooves or troughs 2A and flattened crests 10, best seen in FIG. 6. An optimum angle of approximately 45 degrees exists between the sides of each rib and the radius of the disk. The ribs are uniform in size and shape. They are equi-distant apart. The size of the disk determines the number of ribs, the twists of the rope determine their size and angle. They are straight rather than arcuate. They are more tangential than radii vectors.]

[When the form of my invention having a dual series of annular ribs is employed, I find that the top or crest of one rib is best formed to align with, and be oppositely disposed to, the crest of a rib channeled out of the other groove face. See FIG. 6. This reduces the danger of rope slippage on heavy pulls, as described later. This alignment utilizes the "twist" feature of the rope strands.]

[A rope 3 is an essential part of my novel combination. I prefer to use nylon rope with twisted strands as shown. This is available on the open market. Woven or other rope may be used without departing from the scope of my invention. Rope of three-fourths or one-half inch diameter is chosen for frequent use.]

*As is evident from the drawings and the description herein, the groove 7 extends around the entire periphery of the disk member 1 with a sufficient depth and lateral faces having a sufficient angle with respect to a plane normal to the axis of rotation of disk member 1 so that rope 3 does not contact the bottom thereof during operation of the combination as discussed below. As shown in one specific embodiment, the angle of the lateral faces is 15 degrees to the plane normal to said axis of rotation.*

*As shown in the first embodiment of FIGS. 1–5, troughs or recesses 2 are laterally spaced with respect to each other*

Figure 5:
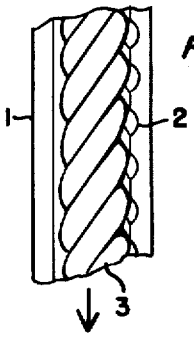
FIG. 5 is a detail showing the rope meshing into the groove with one face smooth and the other face structured with meshing means.
Figure 3:
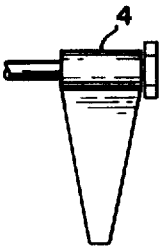
FIG. 3 is an end view of one form of the finger portion of my device.

*to form ribs on the portions of the inner lateral face between troughs 2. Troughs 2 are involute and have parallel straight edges as shown. In this first embodiment, the ribs and troughs 2 are on only one of the lateral faces of the annular groove 7 and the other inner lateral face is smooth as shown. More particularly, the involute troughs 2 have a concave cross-section as best shown in FIG. 5 and extend at an angle with respect to the radius of disk member 1.*

*Considering both embodiments herein, the ribs and troughs 2,2A are uniform in size and shape with troughs 2,2A being equidistant apart with respect to each other. Ribs 10 together with troughs 2,2A provide a wave-like appearance as best seen in FIG. 6. As shown in the embodiments of this invention, ribs 10 are flattened crests. Troughs 2,2A constitute bearing surfaces for gripping rope 3 without slippage when a taut rope 3 wedges into groove 7. The size of disk member 1 determines the number of troughs 2,2A to be placed along the lateral faces and the twist or strands of rope 3 determine the size and angle of troughs 2,2A. The troughs 2,2A are straight rather than arcuate and are more tangential than radii vectors.*

*When the form of my invention incorporates a dual series of troughs 2,2A around the lateral faces of annular groove 7, the top or crest of one rib 10 is aligned with and oppositely disposed to a trough 2,2A channeled out on the opposing lateral face. See FIG. 6. This configuration reduces the danger of rope slippage on heavy pulls as described below. The alignment of ribs 10 and troughs 2,2A on opposing lateral faces of groove 7 utilizes the "twist" feature of the rope strands.*

*Rope 3 is sufficiently non-compressible to effect the meshing of its strands between one of the lateral faces of the annular groove and the troughs 2 disposed on the opposed other lateral face of the annular groove. See particularly FIGS. 5 and 6 for the two different embodiments of this combination. Preferably, nylon rope having twisted strands is used as shown. Such a rope is commercially available on the open market. Other types of woven rope having twisted strands may be used without departing from the scope of my invention. Rope 3 may have any desired diameter with this specific embodiment having a rope diameter of from ¾ inch to ½ inch.*

A rope retainer 6, being preferably an idler wheel or roller, is associated with the disk as can be seen in the first two figures of the drawings. It prevents the rope from leaving the groove too soon.

Proximate thereto is a rope guide 4. This guide may be of various forms. All are tapered in shape to fit into the V-groove. *Thus, rope guide 4 extends into the annular groove to cause unmating of rope 3 from the ribs and troughs 2,2A as disk member 1 rotates.*

I find that a shoe or finger 12 secured to support 8 is an excellent guide for loads or pulls of great resistance.

Figure 4:
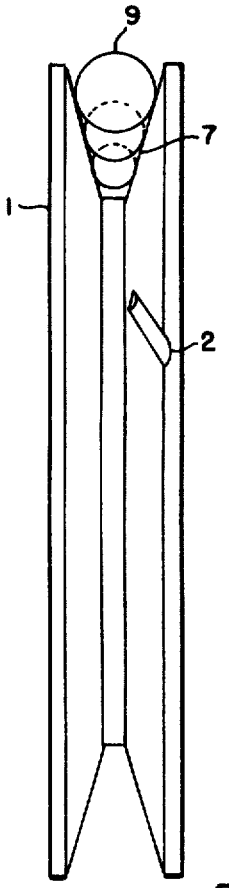
FIG. 4 is a diagram showing the rope in the groove.

One end of the rope 3 is secured to a load to be hoisted or to an object to be pulled. A section of the rope is placed in the V-groove in an arcuate path to the point of contact with guide 4 or 12. This is more than one-half the circumference of the disk. As power is applied to the disk the load resistance causes the rope to become taut. It tends to seat in the groove. The pitch of the V-section of the groove and the diameter of the rope are so related that the rope fits into the groove without reaching the bottom. Attention is directed to item 9 of FIG. 4 showing the rope position as it enters the groove and item 7 showing its position as force is applied. Continued power moves the disk and rope in the direction of the arrows. [As in FIG. 6, each flattened crest 10 abuts a "twist" of rope 3 at 3A forcing it into a recess or trough 2A of the opposite rib. The rib's lateral face 3B moves the resisting rope by positive, non-slip abutment. Because of the twisted and non-compressible form of rope the crest 10 of one side of the groove forces the strands of the approaching "twist" of the rope into the preceding trough on the opposite side of the groove. The taper of the groove tends to cause the "twist" to move in the direction of arrow 11 of FIG. 7. As any particular portion of the rope completes more than one-half the distance around the circle it comes into contact with the guide at point 5 of FIG. 1. The resulting contact of the rope on guide surface 13 (as in FIG. 9) lifts the rope from the groove. In this manner the resistance of the load is overcome in manner substantially equivalent to that taking place when gears are meshed.]

*As in FIG. 6, each flattened crest or rib 10 abuts a "twist" of rope 3 at 3A forcing it into a recess or trough 2A on the opposite lateral face of the groove. The trough's lateral face 3B moves the resisting rope by positive, non-slip abutment. That is, the troughs 2 and 2A are effective to be operatively meshed with strands of rope 3 when the rope is operatively mounted in the groove, as shown. As is evident, troughs 2 and 2A have straight edges, are uniform in size and shape and are laterally spaced an equidistant measure apart with respect to each other. Thus, ribs or crests 10 are formed between edges of adjacent troughs 2 on one lateral face and troughs 2A on the other lateral face of the groove. As shown, ribs or crests 10 are uniform in size and shape on the portions of the inner lateral faces between the troughs.*

*Because of the twisted and non-compressible form of rope 3, the rib or crest 10 of one lateral face of the groove forces the strand of the approaching "twist" of the rope into the preceding trough 2A on the opposite lateral face of the groove. The taper of the groove tends to cause the "twist" to move in the direction of arrow 11 of FIG. 7. As any particular portion of rope 3 completes more than one-half the distance around the circle, it comes into contact with the guide at point 5 of FIG. 1. The embodiment of FIG. 9 has rope 3 coming into contact with rope guide or finger 12 along guide surface 13 as the disk member 1 rotates. Consequently, as is evident, the action of the rope guide in each embodiment unmates the rope strands meshed with the ribs and troughs to lift rope 3 from the groove. The resistance of the load is overcome in this operation in a manner substantially equivalent to that taking place when gears are meshed and unmeshed.*

Although preferred embodiments of my invention are shown and described, it is understood that one skilled in the art may make modifications thereof which will fall within the scope of my subjoined claims.

What is claimed is:

1. In a rope pulling device the combination of:

(a) a disk member, and, (b) an annular groove with a V-shaped cross section provided on the periphery of the disk member, and, (c) a plurality of ribs and troughs transversally disposed at regular intervals on the inner lateral face of said groove, and, (d) a lineal pull rope operatively mounted in said groove whereby its strands *operatively* mesh with [lateral surfaces of the ribs, and,] *the troughs, the troughs have straight edges, are uniform in size and shape and are equally laterally spaced with respect to each other to form the ribs between the edges of adjacent troughs,*

(e) a power source which is operatively connected to the disk member, and, (f) a support upon which the disk member is rotatably mounted.

2. The claim according to claim 1 above wherein the [crests of one ring of] ribs *on one lateral face of the groove* [is] *are* aligned with the troughs of an oppositely disposed *lateral face of the groove* [ring of ribs].

3. The claim according to claim 1 above wherein a rope retainer is mounted for contact with the rope as it recedes from engagement.

4. The claim according to claim 1 above wherein a rope guide is provided in association with the disk member to cause unmating of the rope and [ribs] *troughs.*

*5. In a rope pulling device for use with a power source, the combination comprising:*

*(a) a disk member having an axis of rotation and including an annular groove extending around the entire periphery thereof,*

*(b) said annular groove including opposed inner lateral faces and a V-shaped cross-section having a bottom,*

*(c) a plurality of ribs and troughs transversely disposed at regular intervals on an inner lateral face of said groove,*

*(d) the troughs have substantially straight edges and extend in a direction that is at an angle with respect to the radius of the disk, the edges of adjacent troughs are laterally spaced with respect to each other to form said ribs between the adjacent troughs on portions of said inner lateral face,*

*(e) a lineal pull rope having a plurality of strands operatively mounted in said groove for meshing said strands with the troughs,*

*(f) support means which rotatably supports said disk member, and*

*(g) drive means for rotating the disk member to cause said rope to mesh with the troughs upon approaching the disk member.*

*6. The combination as defined in claim 5 wherein the groove has a sufficient depth and the lateral faces have a sufficient angle with respect to a plane normal to said axis of rotation so the rope does not contact the bottom thereof during operation of said combination.*

*7. The combination as defined in claim 6 wherein said angle of the lateral faces is 15 degrees to said plane.*

*8. The combination as defined in claim 5 wherein the ribs and troughs are on only one of the lateral faces and the other inner lateral face is smooth.*

*9. In a rope pulling device for use with a power source, the combination comprising:*

*(a) a disk member having an axis of rotation and including an annular groove extending around the entire periphery thereof,*

*(b) said annular groove including opposed inner lateral faces and a V-shaped cross-section having a bottom,*

*(c) a plurality of ribs and troughs transversely disposed at regular intervals on an inner lateral face of said groove,*

*(d) the ribs and troughs being substantially straight and extending in a direction that is at an angle with respect to the radius of the disk, said troughs are involute and have parallel straight edges,*

*(e) a lineal pull rope having a plurality of strands operatively mounted in said groove for meshing said strands with the troughs,*

*(f) support means which rotatably supports said disk member, and*

*(g) drive means for rotating the disk member to cause said rope to mesh with the ribs and troughs upon approaching the disk member.*

*10. The combination as defined in claim 9 wherein said involute troughs have a concave shape in cross-section.*

*11. In a rope pulling device for use with a power source, the combination comprising:*

*(a) a disk member having an axis of rotation and including an annular groove extending around the entire periphery thereof,*

*(b) said annular groove including opposed inner lateral faces and a V-shaped cross-section having a bottom,*

*(c) a plurality of ribs and troughs transversely disposed at regular intervals on an inner lateral face of said groove,*

*(d) the ribs and troughs being substantially straight and extending in a direction that is at an angle with respect to the radius of the disk, the troughs extend at an angle of 45 degrees with respect to the radius of the disk member,*

*(e) a lineal pull rope having a plurality of strands operatively mounted in said groove for meshing said strands with the troughs,*

*(f) support means which rotatably supports said disk member, and*

*(g) drive means for rotating the disk member to cause said rope to mesh with the ribs and troughs upon approaching the disk member.*

*12. In a rope pulling device for use with a power source, the combination comprising:*

*(a) a disk member having an axis of rotation and including an annular groove extending around the entire periphery thereof,*

*(b) said annular groove including opposed inner lateral faces and a V-shaped cross-section having a bottom,*

*(c) a plurality of ribs and troughs transversely disposed at regular intervals on an inner lateral face of said groove,*

*(d) the ribs and troughs being substantially straight and in a direction that is at an angle with respect to the radius of the disk, said troughs have parallel straight edges and are laterally spaced with respect to each other to form said ribs on the portions of the inner lateral face between the troughs,*

*(e) a lineal pull rope having a plurality of strands operatively mounted in said groove for meshing said strands with the troughs,*

*(f) support means which rotatably supports said disk member, and*

*(g) drive means for rotating the disk member to cause said rope to mesh with the troughs upon approaching the disk member.*

*13. The combination as defined in claim 12 wherein the ribs comprise flattened crests.*

*14. The combination as defined in claim 5 wherein*

*the ribs and troughs are on both lateral faces,*

*the ribs on one of the lateral faces are aligned with the troughs on the opposed lateral face to effect a positive, non-slip abutment of the strands of the rope therebetween.*

*15. The combination as defined in claim 14 wherein the troughs have parallel straight edges and the ribs comprise flattened crests.*

*16. The combination as defined in claim 15 wherein*

*a rope guide extends into the annular groove to cause unmating of the rope from the troughs as the disk member rotates.*

*17. In a rope pulling device operatively connected with a power source and a linear pull rope having a plurality of strands, the combination comprising:*

*(a) a disk member having an axis of rotation, rotated by said power source and including an annular groove extending around the entire periphery thereof,*

*(b) said annular groove including opposed inner lateral faces and a V-shaped cross-section having a bottom,*

*(c) a plurality of ribs and troughs transversely disposed at regular intervals on an inner lateral face of said groove,*

*(d) the ribs and troughs being substantially straight and extending in a direction that is at an angle with respect to the radius of the disk,*

*(e) the troughs have straight edges, are uniform in size and shape and are laterally spaced an equidistant measure apart with respect to each other to form the ribs between the edges of adjacent troughs, said ribs being uniform in size and shape on the portions of said inner lateral face between the troughs,*

*(f) said troughs being effective to be operatively meshed with the strands of the linear pull rope when said rope is operatively mounted in said groove, and*

*(g) support means which rotatably supports said disk member.*

*18. In a rope pulling device operatively connected with a power source and a linear pull rope having a plurality of strands, the combination comprising:*

*(a) a disk member having an axis of rotation, rotated by said power source and including an annular groove extending around the entire periphery thereof,*

*(b) said annular groove including opposed inner lateral faces and a V-shaped cross-section having a bottom,*

*(c) a plurality of ribs and troughs transversely disposed at regular intervals on an inner lateral face of said groove,*

*(d) the ribs and troughs being substantially straight and extending in a direction that is at an angle with respect to the radius of the disk,*

*(e) said troughs have parallel straight edges and effective to be operatively meshed with the strands of the linear pull rope when said rope is operatively mounted in said groove,*

*(f) said troughs being laterally spaced with respect to each other to form said ribs on the portions of the inner lateral face between the troughs, and*

*(g) support means which rotatably supports said disk member.*

*19. The combination as defined in claim 18 wherein the ribs comprise flattened crests.*

*20. The combination as defined in claim 18 wherein the ribs and troughs are on both lateral faces, the ribs on one of the lateral faces are aligned with the troughs on the opposed lateral face to effect a positive, non-slip abutment of the strands of the rope therebetween.*

*21. The combination as defined in claim 20 wherein a rope guide extends into the annular groove to cause unmating of the rope from the troughs as the disk member rotates.*

*22. The combination as defined in claim 20 wherein the ribs and troughs are uniform in size and shape with the troughs being equidistant apart with respect to each other.*

* * * * *